United States Patent
Horne

[15] 3,696,291
[45] Oct. 3, 1972

[54] EQUIPMENT FOR DETECTING IMPROPER WIRING IN PORTABLE INSTALLATION

[72] Inventor: Arthur P. Horne, Portland, Oreg.

[73] Assignee: Electronics Diversified, Inc., Portland, Oreg.

[22] Filed: Jan. 30, 1970

[21] Appl. No.: 7,009

[52] U.S. Cl. .................................. 324/51, 324/66
[51] Int. Cl. .................................. G01r 31/02
[58] Field of Search ......... 324/51, 54, 107, 108, 133; 340/255; 317/18

[56] References Cited

UNITED STATES PATENTS

| | | | |
|---|---|---|---|
| 3,233,151 | 2/1966 | Fisher | 317/18 |
| 3,492,533 | 1/1970 | Thurston | 317/18 |
| 1,744,840 | 1/1930 | Strieby et al. | 324/133 X |
| 3,356,939 | 12/1967 | Stevenson | 324/51 |
| 3,382,410 | 5/1968 | Grimm | 317/18 |

FOREIGN PATENTS OR APPLICATIONS

| | | | |
|---|---|---|---|
| 807,544 | 1/1959 | Great Britain | 324/51 |
| 892,468 | 3/1962 | Great Britain | 324/51 |

OTHER PUBLICATIONS

Loewe, R. Check that Ground, Allis Chalmers Electrical Review Second Quarter 1948 FIGS. 1–5

Primary Examiner—Gerard H. Strecker
Attorney—Buckhorn, Blore, Klarquist & Sparkman

[57] ABSTRACT

A power wiring error indicator for electrical equipment includes an indicator means coupled between equipment ground and the neutral terminal of a three-phase, four-wire system, or a single phase, three-wire system. Capacitors are connected between each line terminal and equipment ground to provide a return circuit for the indicator means.

7 Claims, 3 Drawing Figures

ARTHUR P. HORNE
INVENTOR

BY
BUCKHORN, BLORE, KLARQUIST & SPARKMAN
ATTORNEYS

EQUIPMENT FOR DETECTING IMPROPER WIRING IN PORTABLE INSTALLATION

BACKGROUND OF THE INVENTION

Frequent electrical connection must be made to portable or semi-portable electrical equipment such as mobile machinery, heavy duty electronic equipment, load control systems, or the like. These equipments often employ three and four-wire input circuits where there is a danger in making the connection improperly, with resultant damage to the equipment. In the case of a portable light dimmer system for theatrical presentations, a comparatively heavy lighting load is usually involved and hence a single phase three-wire, or a three phase, four-wire power source will be the usual input to the dimmer apparatus. Several lighting circuits are then energized between plural conductors and a common neutral. It is often difficult to ascertain the proper connection of the dimmer system to the power means in an unfamiliar building and the connection may be improperly made.

SUMMARY OF THE INVENTION

According to the present invention a power wiring indicator provides a warning that the input power connection has been improperly made, or alternatively, may warn of equipment failure such as a short circuit or the like. Indicator means, preferably comprising a neon lamp, is connected between a neutral input terminal of an electrical equipment and the equipment ground. Also, capacitors are preferably interposed between each line terminal and the equipment or chassis ground. The equipment itself is ordinarily turned off as by opening circuit breakers provided therefor until the input power wiring is completed. Of course, the power circuit to which connection is made is also preferably deenergized by removing building fuses, opening main circuit breakers, or the like. After the connection is made, power is supplied from the building to the input terminals of the equipment. If wires have been interchanged, an indication of the improper connection is given.

The equipment is preferably provided with a separate chassis or equipment ground. However, assuming that a nearby building ground is not available and none is used, it is possible due to equipment failure that the equipment chassis can reside at some high potential during operation of the equipment, thus endangering operating personnel. However, the present circuit also provides an indication of an improper voltage on the equipment chassis after full energization thereof.

It is accordingly an object of the present invention to provide an improved power wiring error indicator for giving warning of improper wiring input connection from a single-phase, three-wire, or a three-phase, four-wire power source.

It is a further object of the present invention to provide an improved power wiring error indicator for giving warning in the case of undesired reversal of equipment power input leads.

It is a further object of the present invention to also provide an indicator for rendering warning in the case of a high potential present on an accessible equipment chassis.

The subject matter which I regard as my invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements.

DRAWINGS

DETAILED DESCRIPTION

Figure 1:
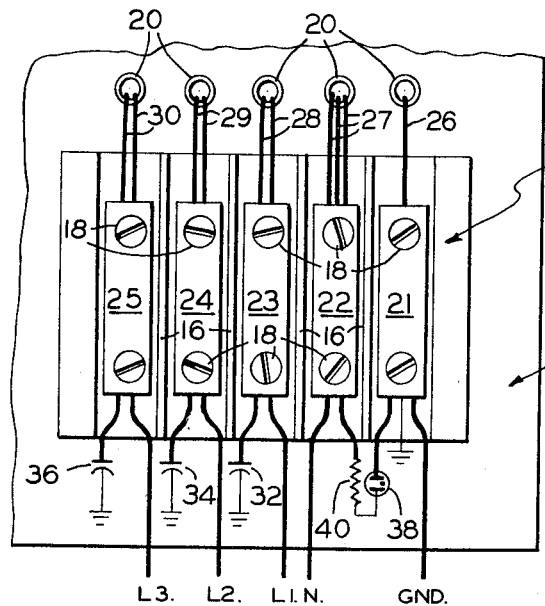
FIG. 1 is a front view of a wiring panel for electrical equipment, incorporating a power wiring error indicator according to the present invention.

Referring to FIG. 1, illustrating an equipment wiring panel incorporating the power wiring error indicator according to the present invention, this wiring panel comprises a terminal block 10 of insulating material secured to the metal frame or chassis 12 of an electrical equipment. In a specific example, this electrical equipment comprised a portable dimmer system for lighting circuitry, which will be described hereinafter in greater detail. Terminal block 10 carries a plurality of parallel metal terminal bars, 21 through 25, separated by barriers 16 located therebetween and forming part of terminal block 10. Conductors which are connected by the terminal bars are received within recessed ends of the terminal bars under tension screws 18. On the equipment side of the terminal bars, these conductors may extend through insulating grommets 20 and provide a source of power as hereinafter more fully described. As illustrated, one such wire 26 extends from the top of terminal bar 21, three wires 27 from terminal bar 22, and pairs of wires, 28, 29, and 30, respectively, from terminal bars 23, 24, and 25. Terminal bar 21 is intended for connection at its lower end to ground, while terminal bar 22 is adapted to receive the neutral conductor marked N. Lines L1, L2, and L3 are the three lines of a three-phase distribution system wherein the voltages on these lines with respect to neutral connection N are equal but 120 degrees out of phase with one another. Lines L1, L2, and L3 are correctly connected to terminal bars 23, 24, and 25, respectively, as shown.

The input power connection illustrated in FIG. 1 may be characterized as a three-phase, four-wire input. The ground connection marked GND at terminal 21 suitably comprises a nearby building ground such as a water pipe or the like, separate from the remaining conductors. Terminal bar 21 is then connected at its upper end via conductor 26 to the equipment chassis. The external building ground ordinarily prevents an undesired electrical potential from appearing on the chassis with respect to ground, which might be injurious to operating personnel.

According to the present invention, an indicator means, here comprising a neon lamp 38 in series with a current limiting resistor 40, is connected between terminal bars 21 and 22, e.g., between the chassis ground and the terminal bar employed for connection to the neutral supply line. Also, capacitors 32, 34, and 36 are respectively interposed between terminal bars 23, 24, and 25 and the chassis ground. As will hereinafter more fully appear, neon lamp 38 will light under a number of different conditions of misconnection of the input power lines.

The capacitance values of capacitors 32, 34, and 36 are equal, being 0.005 microfarads in the case of equipment of a specific embodiment. Resistor 40 of this specific embodiment had a value of 100 K ohms. Although capacitances 32,34,36 are preferred, other high impedance means may be substituted therefor in certain instances. Likewise other indicator means may be substituted for the neon lamp, although the neon lamp is preferred for providing a good indication with minimum current.

Figure 2:
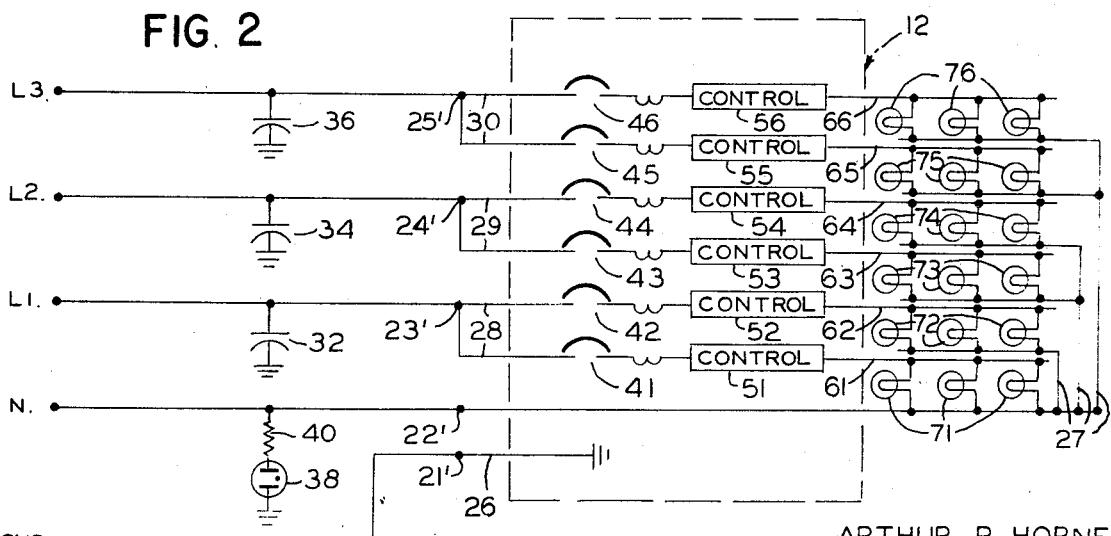
FIG. 2 is a schematic diagram of the FIG. 1 panel and equipment empowered therefrom.

Referring more particularly to FIG. 2, the circuit provided by terminal block 10, the dimmer system within chassis 12, and a lighting circuitry load is illustrated. Terminal blocks 21 through 25 are represented by junction terminals 21' through 25' in the FIG. 2 diagram. As hereinbefore indicated, terminal 21' is connected to chassis ground. Terminal 23' is connected to line L1 and supplies power for lighting circuits comprising paralleled lamps 71 and paralleled lamps 72 via a pair of wires 28. The circuit breaker 41 in series with a control circuit 51 is disposed between the terminal 23' and conductor 61 of the circuit comprising lamps 71. Similarly, a circuit breaker 42 in series with control circuit 52 is interposed between terminal 23' and conductor 62 supplying lamps 72.

Also, terminal 24' empowers paralleled lamps 73 and paralleled lamps 74 through wires 29. Breaker 43 and control circuit 53 are disposed in series between a wire 29 and conductor 63 leading to lamps 73, while breaker 44 and control circuit 54 are in series between the remaining wire 29 and conductor 64 connected to lamps 74. Further, terminal 25' energizes lighting loads comprising paralleled lamps 75 and paralleled lamps 76 by way of wires 30 having breaker 45 and control circuit 55 in series with the conductor 65 leading to the lamp 75 circuit, and with breaker 46 and control circuit 56 in series with the conductor 66 leading to the lamp 76 circuit. The respective paralleled circuits including lamps 71, 72, 73, 74, 75, and 76 are returned to neutral terminal 22' via wires 27. While there are actually a total of six neutral return leads from the six separate lighting circuits, respectively, only three wires 27 are illustrated in FIG. 1. It is appreciated that the returns may be commoned in pairs as illustrated in FIG. 2 such that only three wires or less need be brought out to the terminal block.

In the case of the individual dimmer circuits within chassis 12, a control circuit such as control circuit 51 suitably acts to adjustably reduce the power delivered to paralleled lamps 71. One such advantageous system control circuit 51 includes a pair of reversely connected silicon controlled rectifiers in series with the line and operative on each alternating current cycle in selected phase relation. Thus, during each half cycle of alternating current, the control circuit 51 is energized at a selected time after the beginning of such half cycle for providing current to paralleled lamps 71. This adjustment is achieved without substantial dissipation or waste of power when the lamps are to be dimmed. A circuit of this kind is more fully described in my copending application Ser. No. 7093, filed Jan. 30, 1970 entitled "Control System," assigned to the assignee of the present invention. Since separate control circuits 51 through 56 are employed for the separate lighting circuits comprising lamps 71 through 76, respectively, individual control may be achieved in the six lighting circuits.

Figure 3:
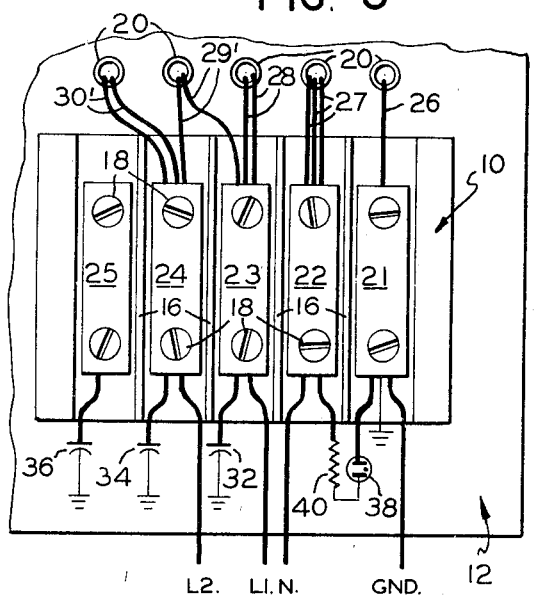
FIG. 3 is another front view of the FIG. 1 panel, illustrating wiring for a single phase three-wire system in place of a three-phase, four-wire system.

FIG. 3 illustrates a variation in the wiring for the FIG. 1 panel adapting the apparatus for three-wire, single phase input. The connection is substantially similar to that illustrated in FIG. 1, except that lines L1 and L2 represent either side of the line with respect to the neutral which is again connected to terminal bar 22. Terminal bar 25 is left unconnected. Wires 28 remain connected to terminal bar 23. However, wires 30' corresponding to wires 30 in FIGS. 1 and 2, are inserted at the top of terminal bar 24, while one of wires 29', corresponding to wires 29 in FIGS. 1 and 2, is connected to terminal bar 23 with the other being connected to terminal bar 24. The neutral wires 27 remain in connection with terminal bar 22. Thus, the six lighting circuits are here divided between the two lines, with three lighting circuits being empowered from one line while the three remaining lighting circuits are empowered from the other. The error indicator operation will remain substantially the same as hereinafter more fully indicated.

Since the light dimmer system is a semi-portable apparatus, frequent connection to power service is required by personnel often not having extensive electrical knowledge. The identity of each conductor may not always be clear even to those skilled in the art when conductors are brought in from a remote location, unless the lines are first energized for conducting a test.

According to the present invention, the connection of the two or three lines and neutral is made to the equipment preferably with the lines deenergized, and indication will subsequently be given if the connection has been made improperly. The lines L1, L2, and L3 (in the case of three phase power) are first deenergized, for example, by removing the main building fuses or operating the main circuit breakers to disconnect position. Also at this time, the present equipment is deenergized as by operating disconnect switching in each of the control circuits 51 to 56 and/or by opening each of the circuit breakers 41 to 46. A building ground is desirably also connected to the apparatus as hereinbefore indicated for securely grounding the chassis of the equipment and protecting the users thereof. The neutral line is also ordinarily grounded at the input power distribution point of the building, but this does not imply that the chassis ground terminal bar 21 should be connected to the supposed neutral line. Terminal bar 21 is desirably connected to a local building ground point or left disconnected.

After connection to the terminal block, power is applied to the input lines by restoring the building fuse or breaker connection. If the connections have been properly made, and if a local building ground is provided, neon lamp 38 will fail to light inasmuch as neutral terminal bar 22 will be at the same potential as ground terminal bar 21. Even if no ground has been provided to the ground terminal bar 21, a "phanton" ground is still provided by means of capacitors 32, 34, and 36, placing the chassis at the neutral point with respect to power provided on lines L1, L2, and L3. Since the capacitors are of equal value, and since the line voltages are conventionally equal and mutually out of phase, the capacitors provide a "Y" connection with zero voltage at their common point.

If, however, the input lines have been miswired so that the neutral line has been connected to terminal bar 23, 24, or 25, while one of the lines L1, L2, or L3 has been improperly connected to neutral terminal bar 22, a difference in voltage will appear between terminal bar 22 and terminal bar 21 grounded to the chassis. If the local building ground has been brought in at terminal bar 21, and terminal bar 22 has been thus improperly connected to the line having a voltage above neutral, it is apparent a voltage difference will appear across neon lamp 38 causing the same to light. Even if a local building ground has not been connected to terminal bar 21, one or more of the capacitors 32, 34, and 36 will provide a return for current to neon lamp 38. For example, one of the terminal bars 23, 24, or 25 which has been improperly connected to a neutral line will provide a return path in such case so that indication of improper wiring will still be given. It should be apparent that operation will be the same in the case of either a three-phase, four-wire connection or in the case of a single phase, three-wire connection. The capacitors 32, 34 and/or 36 see only the neon lamp current which is quite small and these capacitors need be only of small capacitance value in order to carry that current.

If neon lamp 38 does not light with the input lines connected, the loads are energized via the switching in control circuits 51-56, and/or breakers 41 through 46 are closed. If the lamp 38 now lights, it may indicate the miswiring of the lines L1, L2, and/or L3 in the absence of a neutral connection to terminal bar 22 but assuming a local ground wire has been connected to terminal bar 21. If the neutral line has been improperly connected at terminal bar 23, 24, or 25, the voltage at terminal bar 22 will be "offset" with respect to ground through the lamp loads. Therefore, a voltage will then appear at nonconnected neutral terminal bar 22 and lamp 38 will light. The lamp loads in that instance establish a voltage other than zero at terminal bar 22 even though the loads are balanced. If the loads are unbalanced and terminal bar 22 has not been connected, lamp 38 will light in any case indicating the loads should be balanced or a neutral connected.

Also, if a connection has been improperly made, or the equipment is faulty such that the chassis is "hot" or resides at some voltage with respect to ground (assuming no ground connection has been made to terminal bar 21), lamp 38 will light inasmuch as there is a voltage at the grounded chassis with respect to the neutral connection. Let us assume a short circuit in the system, e.g., that a wire has become improperly connected to the equipment chassis. The voltage on the chassis will light neon lamp 38 if terminal bar 22 is properly connected to a neutral line, or even in the absence of such neutral line at terminal bar 22, if the neutral line is not also miswired to the voltage as now appears on the chassis. Thus, ordinarily in the absence of a connection of the neutral line at terminal bar 22, if the chassis resides at a high voltage, the "phantom" neutral is provided through the load circuits with this neutral providing a different voltage level at terminal bar 22 from the voltage which now appears on the chassis, causing the lamp 38 to light. If a high voltage line is improperly connected to ground terminal bar 21 placing high voltage on the chassis, the circuit operates in a substantially similar manner detecting voltage on the chassis different from the voltage level at neutral terminal bar 22.

Thus, the wiring indicator according to the present invention detects a variety of miswiring conditions or faulty equipment connection or operation, before the equipment is damaged by these circumstances, or before injury occurs to operating personnel. The circuit is simple, but effects an increase in the speed with which the equipment can be connected to power mains with reasonable assurance that such connection will have been properly made.

While I have shown and described preferred embodiments of my invention, it will be apparent to those skilled in the art that many changes and modifications may be made without departing from my invention in its broader aspects. I therefore intend the appended claims to cover all such changes and modifications as fall within the true spirit and scope of my invention.

What is claimed is:

1. An electrical equipment comprising:
   plural terminal means for receiving electrical conductors for empowering said electrical equipment, said terminal means including a neutral terminal adapted for connection to a neutral line, and at least two line terminals wherein said two line terminals are adapted to receive lines providing separate voltages with respect to said neutral line for empowering said equipment,
   said equipment further including a circuit reference terminal adapted to receive an external ground connection separate from said electrical conductors for empowering said equipment, but selectively ungrounded,
   indicator means coupled between said neutral terminal and said reference terminal and responsive to a difference in voltage therebetween for delivering an indication upon improper energization of said terminals,
   and separate relatively high impedance means of substantially equal impedance coupled between each of said line terminals and said reference terminal for completing a circuit for establishing a phantom ground return for said means for delivering an indication in the absence of an external ground connection to said circuit reference terminal.

2. The equipment according to claim 1 wherein said means for delivering an indication comprises a neon lamp and a resistance in series therewith connected between said neutral terminal and said reference terminal.

3. The equipment according to claim 1 further including means on the load side of said terminal means for disconnecting said equipment.

4. The equipment according to claim 3 further including separate load circuits connected to said line terminals via the disconnecting means, said load circuits being returned in common to said neutral terminal.

5. The equipment according to claim 4 including three line terminals each adapted to be energized by a line providing a separate voltage with respect to neutral in a three phase system, and six load circuits for connection in pairs to said three line terminals by way of said disconnecting means, and means for alternatively connecting said load circuits in groups of three to each of a pair of said line terminals when only line terminals of said pair are energized with respect to neutral from a single phase, three-wire system.

6. An electrical equipment comprising:

plural terminal means for receiving electrical conductors for empowering said electrical equipment, said terminal means including a neutral terminal adapted for connection to a neutral line and at least two line terminals wherein said two line terminals are adapted to receive lines providing separate voltages with respect to said neutral line for empowering said equipment, said equipment further including a circuit reference terminal adapted to receive an external ground connection separate from said electrical conductors for empowering said equipment, indicator means coupled between said neutral terminal and said reference terminal and responsive to a difference in voltage therebetween for delivering an indication upon improper energization of said terminals, and separate capacitor means of substantially equal impedance coupled between each of said line terminals and said reference terminal for completing a circuit for establishing a phantom ground return for said means for delivering an indication in the absence of an external ground connection to said circuit reference terminal.

7. An electrical equipment comprising:

plural terminal means for receiving electrical conductors for empowering said electrical equipment, said terminal means including a neutral terminal adapted for connection to a neutral line, and at least two line terminals wherein said two line terminals are adapted to receive lines providing separate voltages with respect to said neutral line for empowering said equipment, said equipment further including a circuit reference terminal adapted to receive an external ground connection separate from said electrical conductors for empowering said equipment, indicator means coupled between said neutral terminal and said reference terminal and responsive to a difference in voltage therebetween for delivering an indication upon improper energization of said terminals, and separate relatively high impedance capacitor means of substantially equal impedance coupled between each of said line terminals and said reference terminal for completing a circuit for establishing a phantom ground return for said means for delivering an indication in the absence of an external ground connection to said circuit reference terminal.

* * * * *